(12) United States Patent
Pozzoli

(10) Patent No.: US 7,766,160 B2
(45) Date of Patent: Aug. 3, 2010

(54) CONTAINER FOR A PLURALITY OF DISCS AND THE LIKE WITH CENTRAL RETENTION MEANS

(75) Inventor: Aldo Pozzoli, Inzago (IT)

(73) Assignee: Pozzoli S.p.A., Inzago (IT)

( * ) Notice: Subject to any disclaimer, the term of this patent is extended or adjusted under 35 U.S.C. 154(b) by 166 days.

(21) Appl. No.: 12/010,578

(22) Filed: Jan. 28, 2008

(65) Prior Publication Data

US 2008/0196052 A1 Aug. 14, 2008

(30) Foreign Application Priority Data

Feb. 14, 2007 (IT) ................. MI2007A0273

(51) Int. Cl.
*B65D 85/57* (2006.01)
(52) U.S. Cl. ............... 206/307; 206/308.1; 206/307.1
(58) Field of Classification Search .............. 369/291.1; 206/493, 310, 309, 308.3, 308.1, 307.1, 307, 206/303
See application file for complete search history.

(56) References Cited

U.S. PATENT DOCUMENTS

| | | | | |
|---|---|---|---|---|
| 5,611,426 A | * | 3/1997 | Warfield | 206/308.1 |
| 5,743,390 A | * | 4/1998 | Pozzoli | 206/308.1 |
| 6,626,290 B2 | * | 9/2003 | Byrne et al. | 206/308.1 |
| 6,932,215 B1 | | 8/2005 | Chang | |
| 2004/0144663 A1 | | 7/2004 | Chang | |
| 2005/0092628 A1 | * | 5/2005 | Chang | 206/308.1 |
| 2006/0231433 A1 | | 10/2006 | Rufo, Jr. | |
| 2006/0289318 A1 | * | 12/2006 | Gelardi et al. | 206/308.1 |

FOREIGN PATENT DOCUMENTS

| | | |
|---|---|---|
| EP | 0 676763 A | 10/1995 |
| EP | 1 717 812 A | 11/2006 |
| GB | 2 336 582 A | 10/1999 |

* cited by examiner

*Primary Examiner*—Ehud Gartenberg
*Assistant Examiner*—Kaushikkumar Desai
(74) *Attorney, Agent, or Firm*—Modiano & Associati; Albert Josif; Daniel J. O'Byrne

(57) ABSTRACT

A container for a plurality of discs, comprising a containment body which defines at least one recess for accommodating at least two discs, the recess defining a first region for accommodating at least one first disc and at least one second region for accommodating at least one second disc which is arranged at a higher level than the first region, elements for the central retention of each of the discs being further provided in order to retain them detachably in the recess, the elements for the central retention of the second disc being arranged at the upper level and being superimposed on and spaced from at least one peripheral portion of the first region for accommodating the first disc.

12 Claims, 7 Drawing Sheets

CONTAINER FOR A PLURALITY OF DISCS AND THE LIKE WITH CENTRAL RETENTION MEANS

The present invention relates to a container for a plurality of discs and the like.

BACKGROUND OF THE INVENTION

EP 0676763, assumed included herein by reference, discloses a container for a plurality of discs, particularly CDs, DVDs and other similar optically- or magnetically-readable discs, which allows to provide a container for at least two discs in which it is possible to vary the ratio between the height and width of the container in order to reduce it with respect to the classic two-to-one ratio that would occur by arranging the two discs side-by-side.

Although this embodiment is valid in many practical and functional respects, it has been found to be susceptible of improvements, especially as regards the possibility to provide an overlap between the two discs with a distance between the axes of the two superimposed and spaced discs which is shorter than the radius of the disc, thus allowing to reduce further the dimensional ratio between height and width.

SUMMARY OF THE INVENTION

The aim of the present invention is to solve the problem described above by providing a container for a plurality of discs and the like which allows to retain the discs centrally while allowing to reduce the center distance between the two discs to a distance which is shorter than the radius of such discs.

Within this aim, an object of the invention is to provide a container which allows to extract the discs very easily and simply without damaging them.

Another object of the present invention is to provide a container which, thanks to its particular constructive characteristics, is capable of giving the greatest assurances of reliability and safety in use.

Still another object of the present invention is to provide a container which can be obtained easily starting from commonly commercially available elements and materials and is also competitive from a merely economical standpoint.

This aim and these and other objects, which will become better apparent hereinafter, are achieved by a container for a plurality of discs and the like, according to the invention, which comprises a containment body which defines at least one recess for accommodating at least two discs, said recess defining a first region for accommodating at least one first disc and at least one second region for accommodating at least one second disc which is arranged at a higher level than said first region, means for the central retention of each of said discs being further provided in order to retain them detachably in said recess, characterized in that said means for the central retention of said at least one second disc are arranged at said upper level and are superimposed on and spaced from at least one peripheral portion of said first region for accommodating said at least one first disc.

BRIEF DESCRIPTION OF THE DRAWINGS

Further characteristics and advantages of the present invention will become better apparent from the description of a preferred but not exclusive embodiment of a container for a plurality of discs and the like, illustrated by way of non-limiting example in the accompanying drawings, wherein.

DESCRIPTION OF THE PREFERRED EMBODIMENTS

Figure 1:
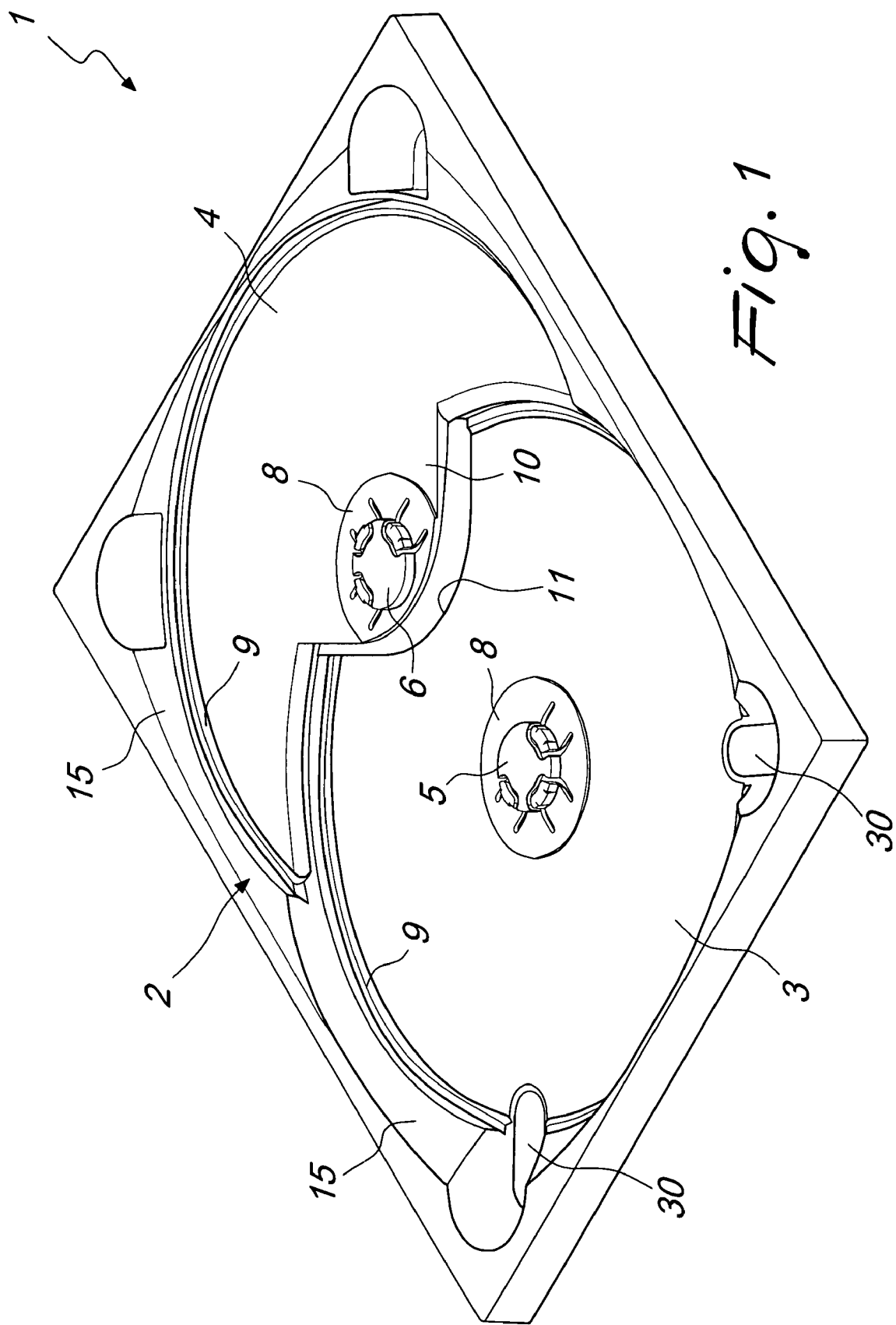
FIG. 1 is a perspective view of a tray-shaped containment body.
Figure 2:
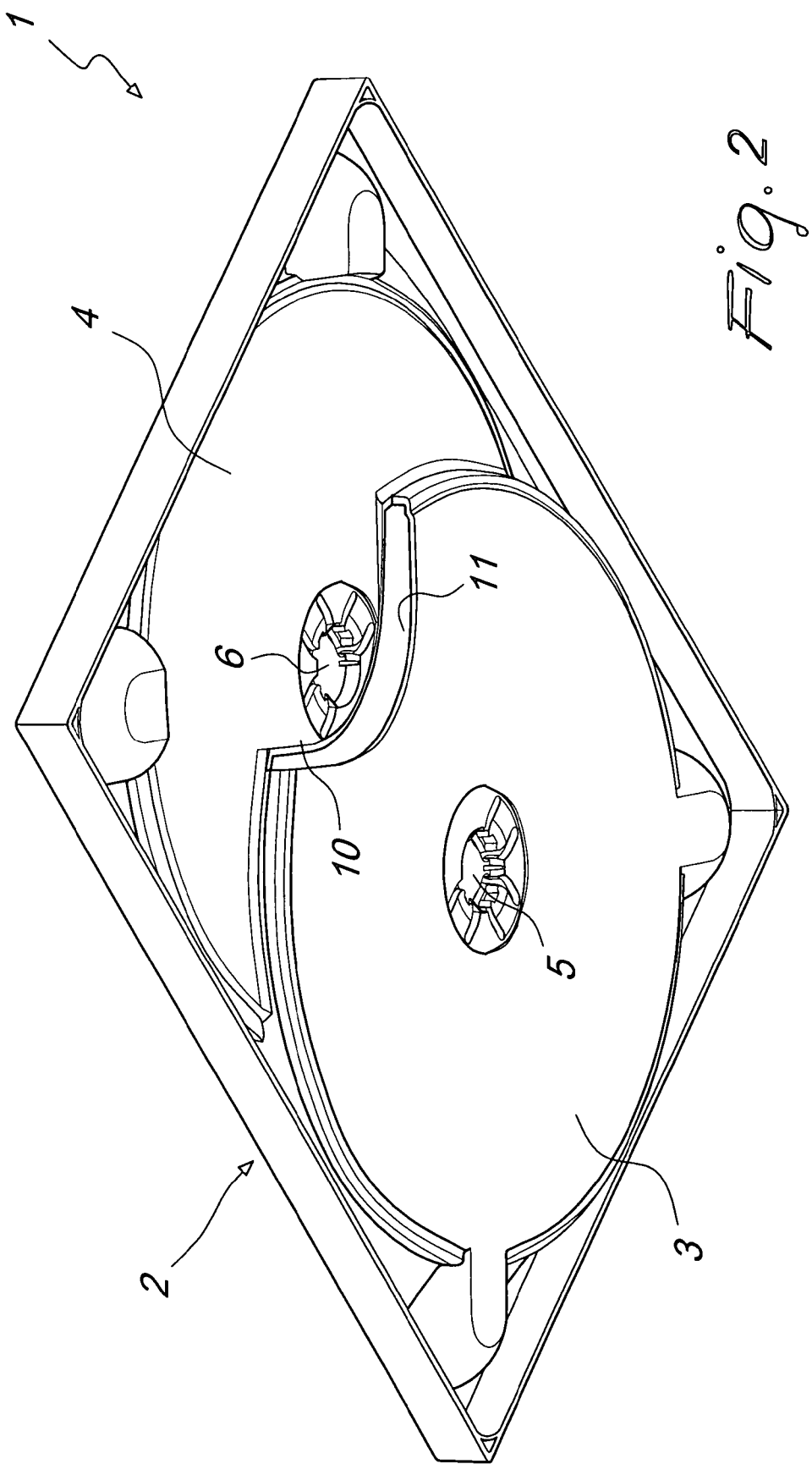
FIG. 2 is a perspective view of the containment body, taken from the lower face.
Figure 3:
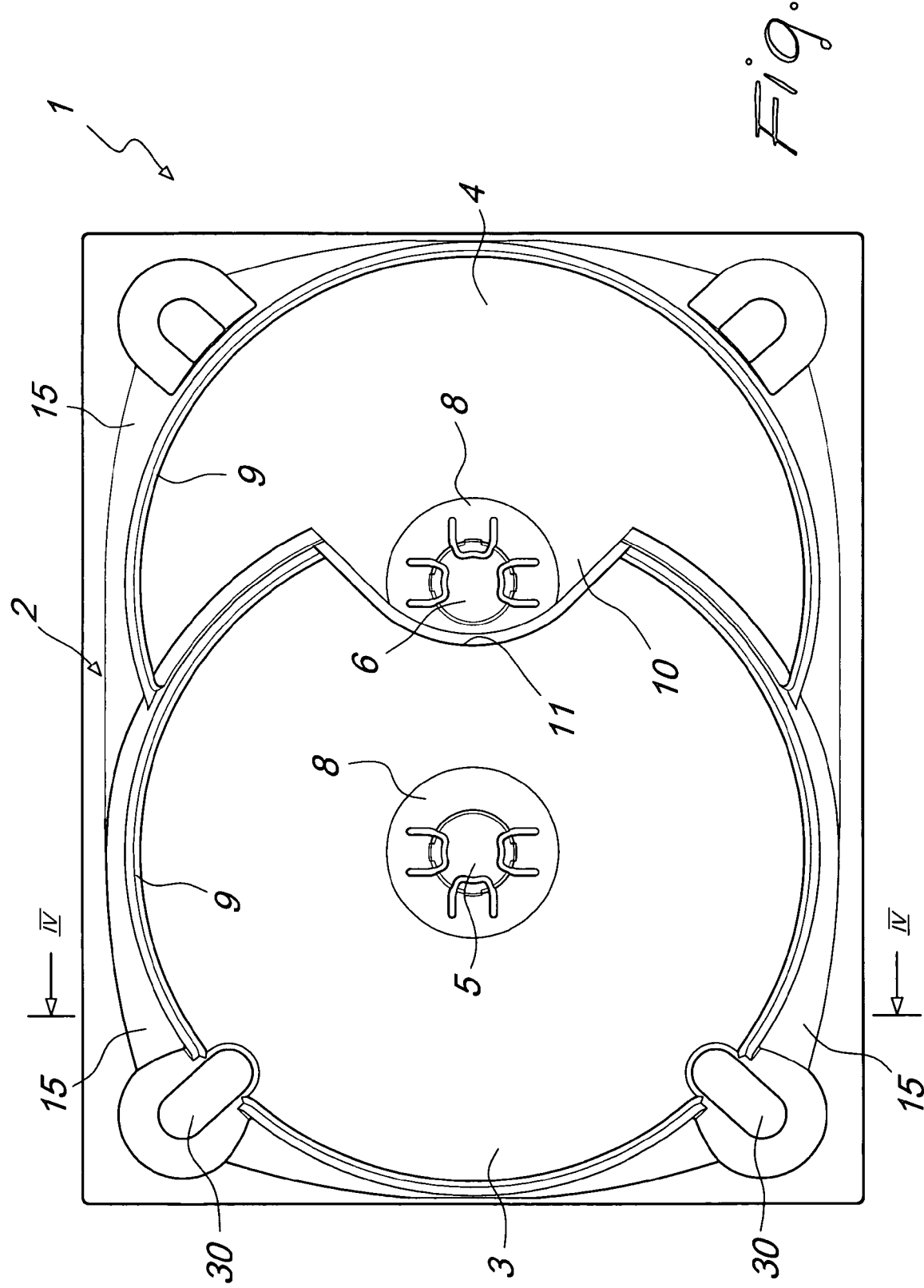
FIG. 3 is a plan view of the containment body.
Figure 4:
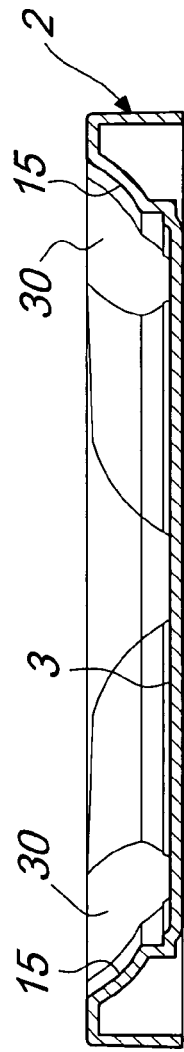
FIG. 4 is a sectional view, taken along the line IV-IV of FIG. 3.

With reference to the figures, the container for a plurality of discs and the like comprises a containment body, which can be constituted by a tray, generally designated by the reference numeral 1, which in a per se known manner is connected inside a jacket, not shown in the drawings.

Figure 10:
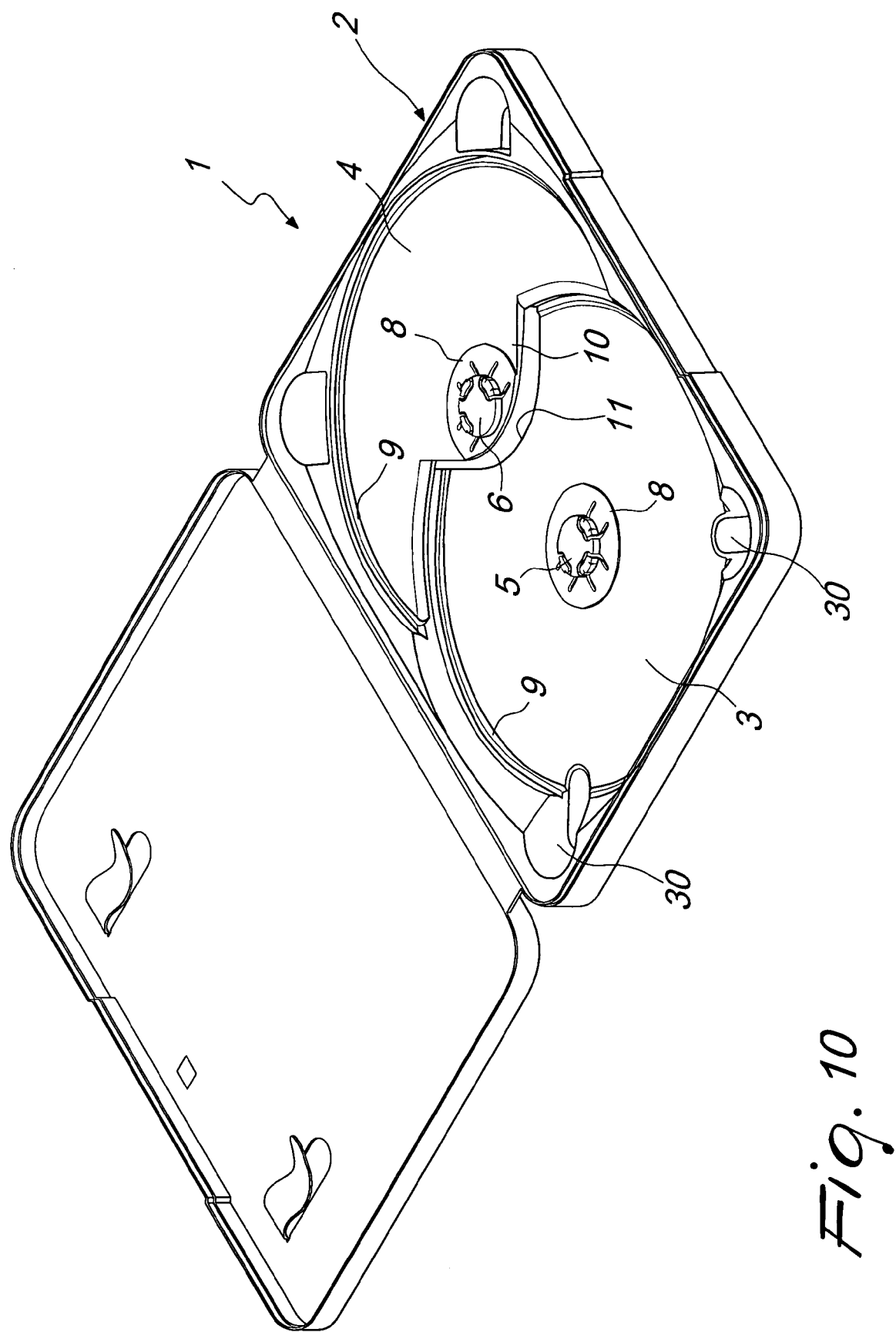
FIG. 10 is a view of an embodiment in which the containment body is provided directly by a case.

Likewise, the containment body, designated by the reference numeral 1' in FIG. 10, can be an integral part of a traditional case which is provided monolithically also with the closure cover.

The type of containment body may obviously be changed and may be constituted by any one of the containment bodies typically used to provide containers for discs, particularly CDs, DVDs, and optical and/or magnetic discs in general.

The containment body defines at least one recess, generally designated by the reference numeral 2, which in the specific example of two discs is substantially shaped like a figure-of-eight and forms at least one first region 3 for accommodating at least one first disc, designated by the reference letter A, and at least one second region 4 for accommodating at least one second disc B, which is arranged at a higher level than the first region.

The regions 3 and 4, in a per se known manner, have central retention means which can be constituted by the ordinary hubs 5 and 6 which engage the central hole of the disc or optionally by elastic central elements, designated by the reference numerals 5' and 6', which also act at the central hole of the disc.

Figure 8:
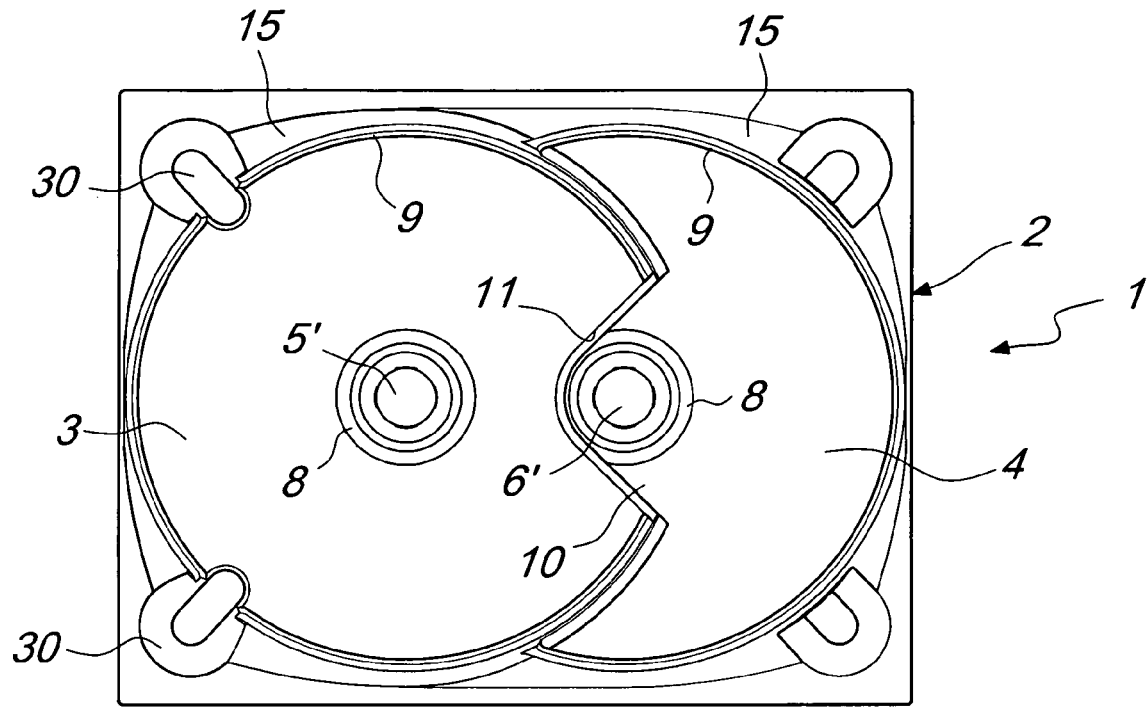
FIGS. 8 and 9 are plan views of the containment bodies with different central retention means.
Figure 9:
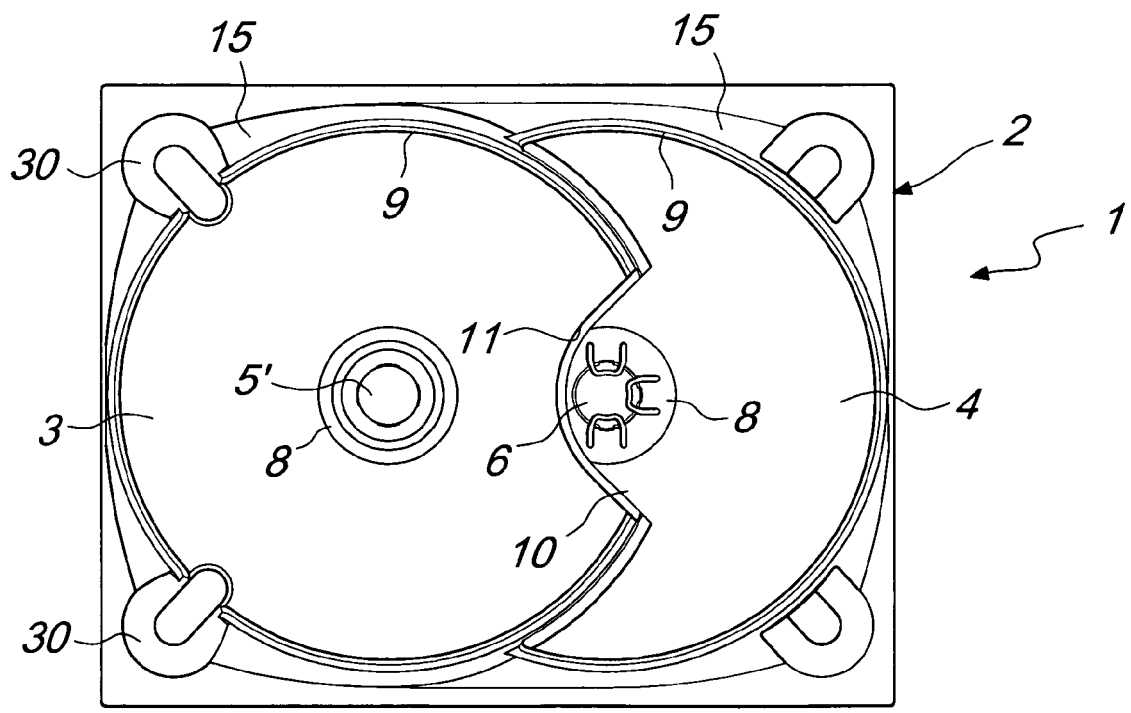

It is of course also possible to use any other type of retention means which engage the hole and it is possible to provide mutually different central means for the first and second discs, as shown schematically in FIGS. 8 and 9.

The means 5 and 6 are designed to retain detachably the discs A and B inside the recess and, in a per se known manner, the regions 3 and 4 have a central support 8 and a peripheral supporting protruding rim 9 on which the disc rests.

The characterizing element of the invention is constituted by the fact that the central retention means 6 of the second disc are arranged at a protrusion 10, which is arranged in the second region at a higher level and protrudes above the first region 3 so that the central retention means 6 are superimposed and spaced with respect to a peripheral portion of the first disc accommodation region.

For practical molding reasons, the protrusion 10 is arranged at a hollow 11 provided in the first region 3.

With this arrangement, the center distance of the two discs is shorter than the radius of the discs, and it is thus possible to reduce at will the dimensional ratio between the height and width of the container of the discs.

Another important aspect is constituted by the fact that in order to facilitate the correct insertion and centering of the discs inside the corresponding regions defined by the recess 2, the containment body has, at the peripheral edges of such recess, sloping edge portions 15, which in a way push and center the disc with respect to the corresponding positioning regions.

As pointed out in the drawings, the sloping edge portions 15, formed at the first region located at a lower level, is of course more conspicuous than the sloping edge provided at the second region, which is located at a higher level.

Figure 5:
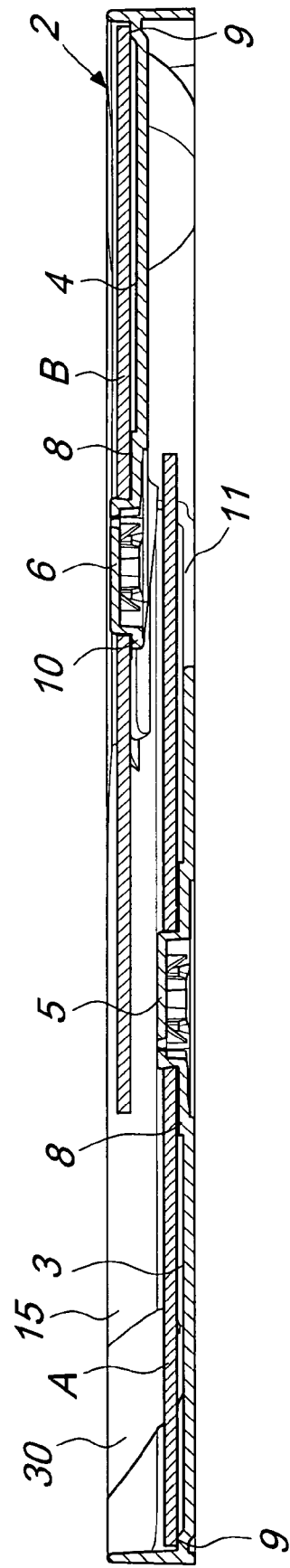
FIG. 5 is a sectional view of the containment body, taken along a longitudinal plane, with two discs in position.
Figure 6:
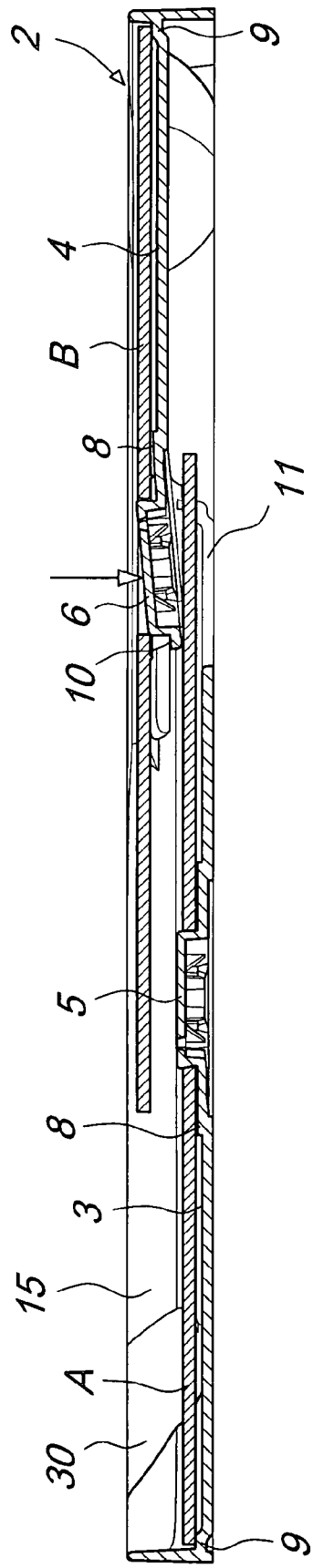
FIG. 6 is a sectional view of the step for the pushbutton disengagement of the disc arranged upwardly.
Figure 7:
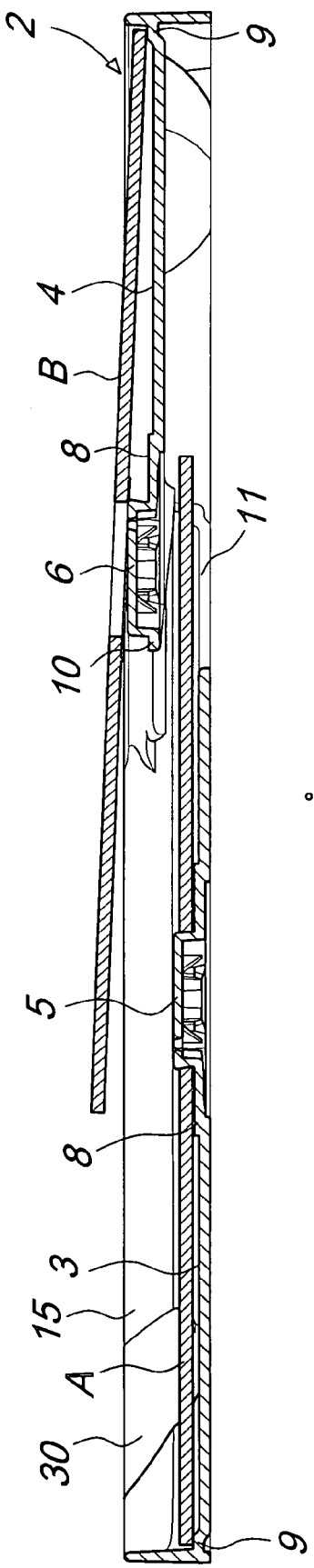
FIG. 7 is a sectional view of the disengaged disc.

Another important characteristic of the invention resides in that the means for the central retention of the second disc, though being provided in a traditional manner, can behave like pushbutton means, by utilizing in practice the flexibility of the protrusion 10, as shown clearly in FIGS. 5 to 7.

With this arrangement, by pressing at the central retention means 6 or 6', in practice the protrusion flexes with respect to the disc, which is instead retained by the protruding rim 9, so that the central retention means, constituted by the hub or by any other per se known solution, in practice disengage from the central hole of the disc and, once pressure has ended, the protrusion, by returning to its initial position, lifts the disc, which can be picked up easily.

In order to remove the first disc it is possible to provide the traditional indents 30, which allow to access the peripheral region of the disc in order to apply the lifting action that disengages it from the central retention means.

From what has been described above it is evident that the invention achieves the proposed aim and objects, and in particular the fact is stressed that a container is provided in which it is possible to arrange the two discs so that they are mutually superimposed and mutually offset with a center distance which can be adjusted at will and in any case can be shorter than the radius of the discs, with the consequent possibility to vary at will the dimensional ratios of the container.

Another important aspect of the invention is further constituted by the fact that the containment body, in the peripheral region of the recess, defines a sloping edge which acts as a conveyance and centering element for the disc with respect to the central retention means, thus making the positioning of the discs particularly easy and straightforward.

Moreover, by taking advantage of the inherent elasticity of the protrusion, which in practice cantilevers out in the second region, it is possible to achieve pushbutton disengagement without having to resort to the pushbutton central hubs, which are particularly complicated from a structural standpoint and are generally scarcely reliable.

The invention thus conceived is susceptible of numerous modifications and variations, all of which are within the scope of the appended claims.

All the details may further be replaced with other technically equivalent elements.

In practice, the materials used, as well as the contingent shapes and dimensions, may be any according to requirements.

The disclosures in Italian Patent Application no. MI2007A000273, from which this application claims priority, are incorporated herein by reference.

What is claimed is:

1. A container for a plurality of discs, comprising a containment body which defines at least one recess for accommodating at least two discs, said recess defining a first region for accommodating at least one first disc and at least one second region for accommodating at least one second disc which is arranged at a higher level than said first region, means for central retention of said at least one first disc and said at least one second disc being further provided in order to retain said discs detachably in said recess, wherein said means for the central retention of said at least one second disc are arranged at said higher level and are superimposed on and spaced from at least one peripheral portion of said first region for accommodating said at least one first disc, said recesses comprising, at peripheral edges thereof, sloping portions which are adapted to act as a centering element for said discs which can be mated with said central retention means.

2. The container according to claim 1, comprising, at said second region, a protrusion which is superimposed on said first region, said protrusion supporting said central retention means.

3. The container according to claim 1, wherein said containment body has, at said protrusion, a hollow on said first region.

4. The container according to claim 1, wherein the distance of the axes of said first and second discs is shorter than the radius of said discs.

5. The container according to claim 2, wherein said protrusion is elastically flexible with respect to said second region.

6. The container according to claim 1, wherein said means for the central retention of said at least one second disc can be actuated in a pushbutton fashion for their disengagement from said second disc supported in said second region at least at a peripheral portion.

7. The container according to claim 1, wherein at least said means for central retention of said at least one second disc can be disengaged from said at least one second disc by flexing said protrusion with respect to said second region.

8. A container for a plurality of discs, comprising a containment body which defines at least one recess for accommodating at least two discs, said recess defining a first region for accommodating at least one first disc and at least one second region for accommodating at least one second disc which is arranged at a higher level than said first region, means for central retention of said at least one first disc and said at least one second disc being further provided in order to retain said discs detachably in said recess, wherein said means for the central retention of said at least one second disc are arranged at said higher level and are superimposed on and spaced from at least one peripheral portion of said first region for accommodating said at least one first disc, a protrusion being provided at said second region, said protrusion being superimposed on said first region and said central retention means, wherein said protrusion is elastically flexible with respect to said second region.

9. The container according to claim 8, wherein said containment body has, at said protrusion, a hollow on said first region.

10. The container according to claim 8, wherein the distance of the axes of said first and second discs is shorter than the radius of said discs.

11. The container according to claim 8, wherein said means for the central retention of said at least one second disc can be actuated in a pushbutton fashion for their disengagement from said second disc supported in said second region at least at a peripheral portion.

12. The container according to claim 8, wherein at least said means for central retention of said at least one second disc can be disengaged from said at least one second disc by flexing said protrusion with respect to said second region.

* * * * *